US012104793B2

(12) United States Patent
Malbois (10) Patent No.: US 12,104,793 B2
(45) Date of Patent: Oct. 1, 2024

(54) FUEL INJECTION DEVICE FOR A TURBOJET ENGINE AFTERBURNER

(71) Applicant: SAFRAN AIRCRAFT ENGINES, Paris (FR)

(72) Inventor: Pierre André Gabriel Malbois, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/555,930

(22) PCT Filed: Apr. 15, 2022

(86) PCT No.: PCT/FR2022/050716
§ 371 (c)(1),
(2) Date: Oct. 18, 2023

(87) PCT Pub. No.: WO2022/223916
PCT Pub. Date: Oct. 27, 2022

(65) Prior Publication Data
US 2024/0200780 A1     Jun. 20, 2024

(30) Foreign Application Priority Data
Apr. 19, 2021   (FR) .................................. 2103991

(51) Int. Cl.
*F23R 3/20*      (2006.01)
*F02C 7/18*      (2006.01)
(Continued)

(52) U.S. Cl.
CPC ................ *F23R 3/20* (2013.01); *F02C 7/18* (2013.01); *F02C 7/22* (2013.01); *F02K 3/10* (2013.01)

(58) Field of Classification Search
CPC ... F02K 3/10; F02K 3/105; F02K 3/11; F23R 3/20; F23R 3/18; F23R 3/22; F23R 3/24; F02C 7/18; F02C 7/22
See application file for complete search history.

(56) References Cited

U.S. PATENT DOCUMENTS 3,465,525 A * 9/1969 Cowley ..................... F23R 3/24
60/762
4,887,425 A * 12/1989 Vdoviak ................. F23D 23/00
60/761
(Continued)

FOREIGN PATENT DOCUMENTS

FR          2709342 A1     3/1995

OTHER PUBLICATIONS

International Search Report for PCT/FR2022/050716 dated Aug. 4, 2022.
Written Opinion for PCT/FR2022/050716 dated Aug. 4, 2022.

*Primary Examiner* — Jason H Duger
(74) *Attorney, Agent, or Firm* — Pearne & Gordon LLP (57) ABSTRACT

A flame-holder device for a turbojet afterburner comprises an annular row of flame-holder arms, each having an inner branch having a free end and another end, and two outer branches which extend from the other end (52) and diverge from one another in a direction extending from the free end to the other end, such that the inner branch transitions radially outward into the two outer branches which diverge radially outward from one another in two opposing circumferential directions, thereby forming mutually approaching areas between consecutive flame-holder arms for enabling the flame to spread from arm to arm.

12 Claims, 5 Drawing Sheets

(51) Int. Cl.
*F02C 7/22* (2006.01)
*F02K 3/10* (2006.01)

(56) References Cited

U.S. PATENT DOCUMENTS

| | | | | |
|---|---|---|---|---|
| 5,396,761 | A * | 3/1995 | Woltmann | F23R 3/20 60/749 |
| 5,437,159 | A * | 8/1995 | Ansart | F23R 3/28 60/749 |
| 5,813,221 | A | 9/1998 | Geiser et al. | |
| 6,112,516 | A * | 9/2000 | Beule | F23R 3/20 60/749 |
| 2006/0016193 | A1* | 1/2006 | Roche | F02K 3/11 60/761 |
| 2006/0032231 | A1* | 2/2006 | Andersson | F23R 3/20 60/765 |

* cited by examiner

FUEL INJECTION DEVICE FOR A TURBOJET ENGINE AFTERBURNER

CROSS-REFERENCE TO RELATED APPLICATIONS

This is the National Stage of PCT international application PCT/FR2022/050716, filed on Apr. 15, 2022, which claims the priority of French Patent Application No. 2103991, filed Apr. 19, 2021, both of which are incorporated herein by reference in their entireties.

TECHNICAL AREA

The present invention relates to the field of turbojet engines intended for aircraft propulsion and comprising an afterburner channel. More particularly, it relates to a fuel injection device for an afterburner channel and a turbojet engine comprising such a device.

PRIOR ART

Turbojet engines of known types, in particular those intended for supersonic flight, comprise in their rear portion, also called rear body, an afterburner channel, also called "reheat channel", in which the gas flow coming from the turbine could undergo a new combustion thanks to the oxygen remaining therein, before expanding in an ejection nozzle.

Fuel injection devices, also called fuel injector arms, are generally arranged at the inlet of the combustion channel to vaporize fuel downstream in the direction of flame-holder arms.

Fuel injection devices of a known type comprise a fuel tube having a tubular wall provided with fuel ejection ports, as well as an air tube having a tubular wall provided with cooling air passage ports to enable the diffusion of relatively cool air towards the fuel tube and thus limit the rise in temperature of the latter during operation.

In this context, there is a need for an improved fuel injection device.

DISCLOSURE OF THE INVENTION

To this end, the invention provides a fuel injection device for a turbojet engine afterburner, comprising:
a base intended to connect the fuel injection device to an afterburner channel casing,
a fuel tube having a tubular wall provided with fuel ejection ports and defining an outer surface of the fuel tube,
an air tube having a tubular wall provided with cooling air passage ports, and
a casing defining a volume in which the air tube extends with some clearance and outside of which the fuel tube extends,
wherein the casing includes a fuel tube side portion extending between the air tube and the fuel tube and having a concave outer surface opposite the fuel tube, an opposite side portion having a convex outer surface, and two lateral portions each connecting the fuel tube side portion to the opposite side portion and have outer surfaces respectively in aerodynamic continuity with the outer surface of the fuel tube;
wherein the fuel tube extends opposite and at a distance from the fuel tube side portion of the casing,
wherein the casing defines cooling air outlets formed in the lateral portions of the casing and which connect the volume defined by the casing to the outside of the device,
and wherein the fuel tube, the air tube and the casing are rigidly connected to the base independently of each other and extend freely relative to each other from the base.

Thus, the invention enables a free differential expansion of the fuel tube, the air tube and the casing, relative to each other. Thus, the wear problems encountered with devices of known types, due to differential expansions in operation, can be avoided or at least attenuated.

According to other advantageous aspects of the invention, the connection device has one or more of the following features, considered separately or according to any technically-feasible combination:
each of the cooling air outlets comprises at least one row of air ejection ports opening throughout an outer surface of the casing;
the lateral portions of the casing converge towards each other in the direction of the fuel tube side portion;
the tubular wall of the air tube includes a fuel tube side portion which is free of cooling air passage ports and opposite which the cooling air outlets open into the volume defined by the casing;
the cooling air passage ports are arranged in several rows extending along a central axis of the air tube, said rows being evenly distributed around said central axis within a portion of the tubular wall of the air tube complementary to said fuel tube side portion of the tubular wall of the air tube;
the tubular wall of the fuel tube includes an air tube side portion, as well as lateral portions in which the fuel ejection ports are formed and which are thicker than the air tube side portion;
the cooling air outlets are arranged on either side of a common midplane of the fuel tube and of the air tube;
the cooling air outlets have air ejection directions which intercept, outside the device, a plane defined by fuel ejection axes respectively defined by the fuel ejection ports;
the fuel ejection ports extend orthogonally to the common midplane of the fuel tube and of the air tube.

The invention also relates to a turbojet engine rear portion, comprising an afterburner channel, an afterburner channel casing surrounding said channel, and at least one fuel injection device of the type described hereinabove connected to the afterburner channel casing, so that the air tube is located upstream of the fuel tube.

In preferred embodiments of the invention, the base of each fuel injection device includes at least one air intake port arranged to supply the air tube with air derived from a secondary flow of the turbojet engine.

The invention also relates to an aircraft turbojet engine, comprising a rear portion of the above-described type.

BRIEF DESCRIPTION OF THE DRAWINGS

The invention will be better understood, and other details, advantages and features thereof will appear upon reading the following description given as a non-limiting example and with reference to the appended drawings wherein.

In all of these figures, identical references may refer to identical or similar elements.

DETAILED DISCLOSURE OF PREFERRED EMBODIMENTS

Figure 1:
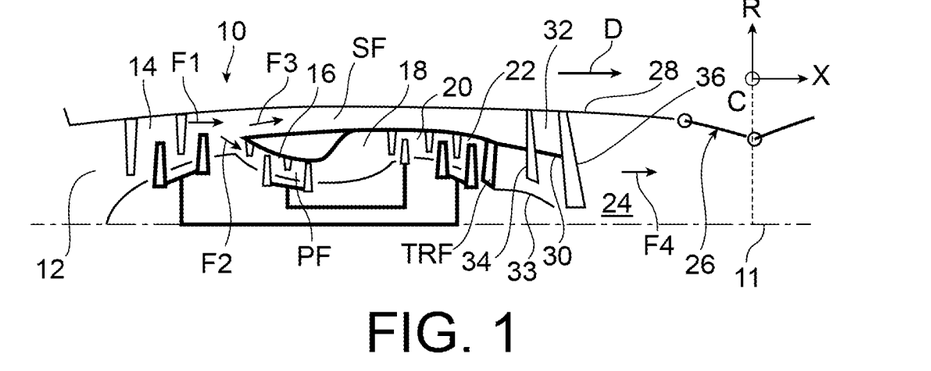
FIG. 1 is a schematic half-view in axial section of a turbojet engine comprising an afterburner channel.

FIG. 1 illustrates a turbojet engine 10, for example with a twin-spool bypass turbojet engine, intended for example for the propulsion of an aircraft capable of supersonic flight, and therefore intended in particular to be installed in the fuselage of such an aircraft. Of course, the invention is applicable to other types of turbojet engines.

Throughout this description, the axial direction X is the direction of the longitudinal axis 11 of the turbojet engine. Unless stated otherwise, the radial direction R is at all points a direction orthogonal to the longitudinal axis 11 and passing through the latter, and the circumferential direction C is at all points a direction orthogonal to the radial direction R and to the longitudinal axis 11. The qualifiers "upstream" and "downstream" are defined with reference to a general direction D of the gas flows in the turbojet engine 10.

For illustration, such a turbojet engine 10 comprises, from upstream to downstream, an air inlet 12, a low-pressure compressor 14, a high-pressure compressor 16, a combustion chamber 18, a high-pressure turbine 20, a low-pressure turbine 22, an afterburner channel 24, and a variable-geometry nozzle 26, for example of the convergent-divergent type. All these members of the turbojet engine are centered according to the longitudinal axis 11 of the turbojet engine.

An afterburner channel casing 28 surrounds said channel. In addition, a flow 15 separation shroud 30, commonly called "confluence", extends inside the casing 28 concentrically with the latter so as to externally delimit the inlet of the afterburner channel 24 and to delimit, with the casing 28, an annular channel 32.

In a well-known manner, the high-pressure compressor 16, the combustion chamber 18, and the high-pressure 20 and low-pressure 22 turbines define a 20 primary flow path PF. The latter is surrounded by a secondary flow path SF of the turbine engine which extends from upstream to downstream, from an outlet of the low-pressure compressor 14 up to a downstream end of the flow separation shroud 30, and which thus includes the aforementioned annular channel 32. Thus, in operation, air F1 which has entered through the air inlet 12 and which has been 25 compressed by the low-pressure compressor 14, is then split into a primary flow F2 which circulates in the primary flow path PF and into a secondary flow F3 which circulates in the secondary flow path SF. The primary flow F2 is then compressed further in the high-pressure compressor 16, then mixed with fuel and ignited in the combustion chamber 18, before undergoing expansion in the high-pressure turbine 20 then in the low-pressure turbine 22.

The combustion gases forming the primary flow F2 at the outlet of the turbine and the secondary flow F3 mix within the afterburner channel 24 from the downstream end of the flow separation shroud 30, and thus form an exhaust gas flow F4 which continues to flow in the afterburner channel 24 and then escapes from the turbojet engine 10 throughout the outlet delimited by the nozzle 26.

In the operating mode with afterburning, for example to propel an aircraft at supersonic speeds, fuel is injected into the gas flow within the afterburner channel 24, and the mixture thus formed is ignited within this channel in order to generate additional thrust.

To this end, fuel injection devices 34, generally arm-like shaped, are arranged at the inlet of the afterburner channel 24 to vaporize fuel downstream in the direction of flame-holder arms 36 intended to promote the stabilization of the flames.

Figure 2:
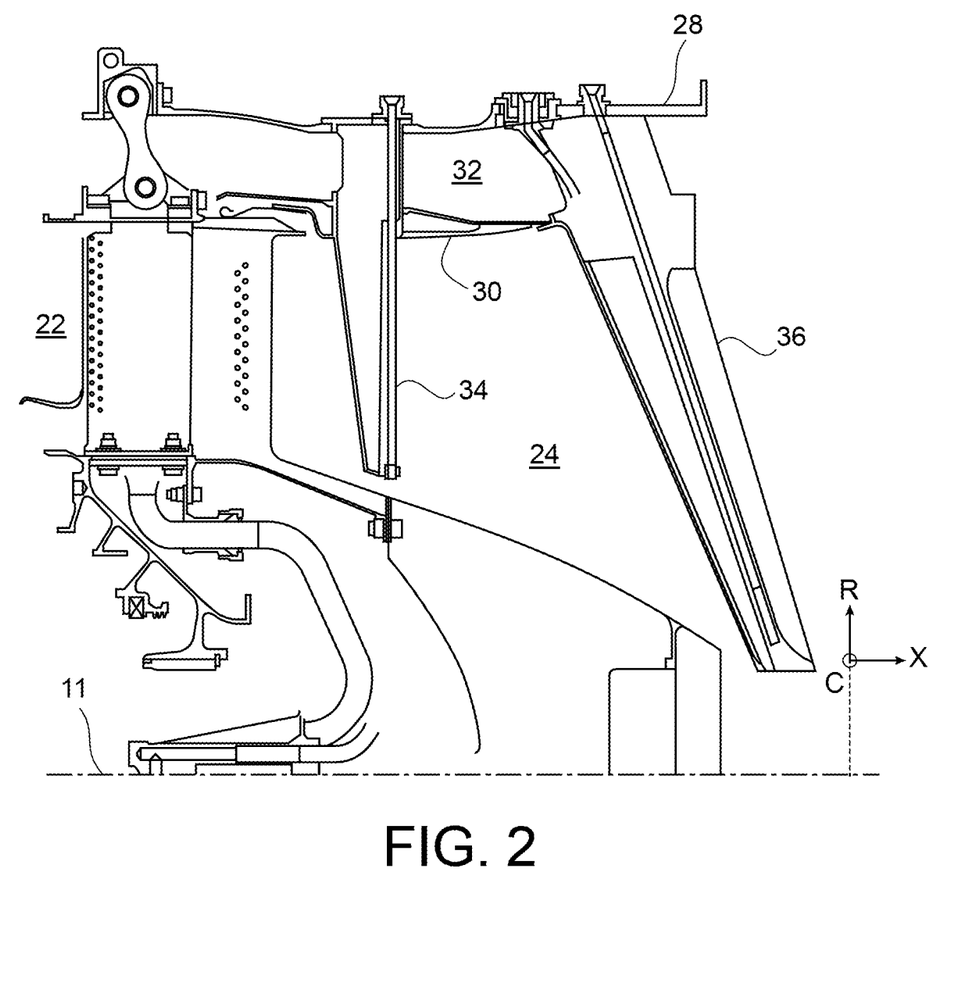
FIG. 2 is a schematic half-view in axial section of a rear portion of the turbojet engine of FIG. 1, comprising at least one fuel injection device according to a preferred embodiment of the invention.

As this appears more clearly in FIG. 2, the fuel injection devices 34 and the flame-holder arms 36 are fixedly connected at their radially outer ends to the afterburner channel casing 28, and the devices 34 and the arms 36 have free radially inner ends.

The fuel injection devices 34 and the flame-holder arms 36 extend throughout openings provided to this end within the flow separation shroud 30.

Figure 3:
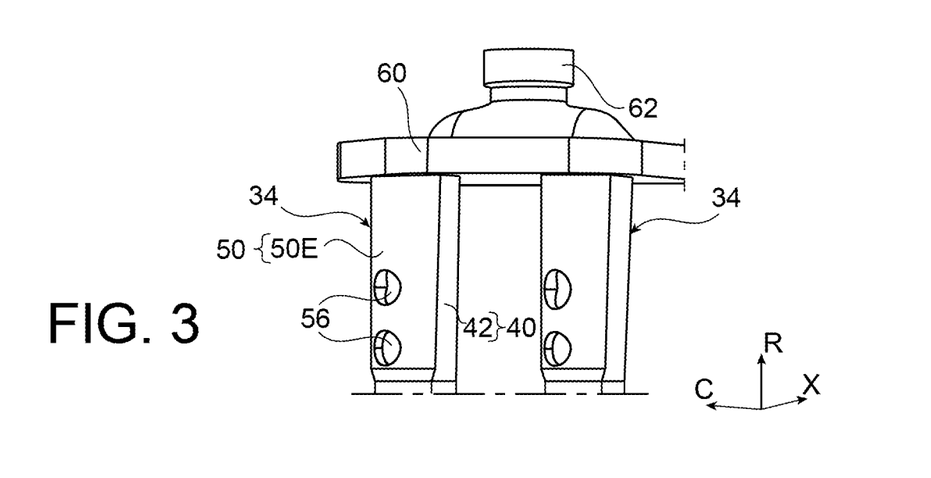
FIG. 3 is a schematic perspective view of a radially outer portion of an assembly comprising two fuel injection devices of a known type.

The document FR2909438 discloses in its FIGS. 1 and 3 an example of such a fuel injection device.

Figure 4:
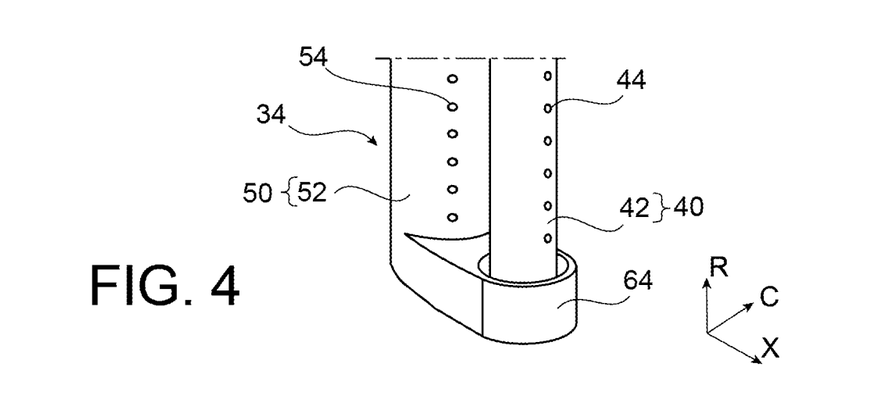
FIG. 4 is a schematic perspective view of a radially inner portion of one of the devices of the assembly of FIG. 3.

Referring to the appended FIGS. 3 and 4, another fuel injection device 34 of a known type comprises a fuel tube 40 having a tubular wall 42 provided with ports 44 intended to eject or spray fuel downstream in the primary flow F2, as well as an air tube 50 having a tubular wall 52 provided with ports 54 intended to eject cooling air in the direction of the fuel tube 40 in order to thermally protect the latter by establishing an air film.

In a radially outer end portion 50E (FIG. 3) intended to extend in the annular channel 32 outside relative to the flow separation shroud 30, the air tube 50 has one or more air intake port(s) 56 (for example two in number) by which relatively fresh air from the secondary flow F3 could enter the air tube 50 and flow radially inwards within the latter before being finally ejected therefrom throughout the ports 54.

As shown in FIG. 3, the fuel tube 40 and the air tube 50 are fastened together by their radially outer ends to a fastening platform 60 intended to connect the device to the casing 28, and comprising a fuel inlet 62 configured to supply fuel to the fuel tube 40. The two tubes 40 and 50 are also held together by centering bushings (one of which 64 is visible in FIG. 4) enabling a relative slip of the tubes 40 and 50 to take into account the differential expansions of these in operation. Indeed, when starting up the afterburner in particular, the circulation of relatively cold fuel in the fuel tube 40 causes significant differential expansions.

In the example illustrated in FIGS. 3 and 4, two fuel injection devices 34 share a common fastening platform 60 intended to connect together the two devices to the casing 28, the assembly thus formed therefore forming a double fuel injector arm.

There is a need to improve such fuel injection devices.

Indeed, the Inventors have determined that the injection of fuel and cooling air in the same direction is not optimal with regards to fuel atomization and makes this atomization dependent on the dynamics of the flow of the primary flow, in particular the gyration of this flow.

In addition, the thermodynamic cycles of engines, in particular those intended for military aircrafts, are increasingly thermally severe, in particular with regards to the primary flow.

Therefore, high thermal gradients, generated during the injection of relatively cool fuel, are likely to cause the formation of thermal cracks at the fuel ejection ports on the fuel tube. Such cracks are visible only upon a penetrant check and could therefore cause a fuel tube to break up if they are not detected in time. This results in a need for frequent inspections, generating additional costs.

Furthermore, because of such thermodynamic cycles, the contact areas between the fuel tubes and the centering bushings are subject to premature wear.

Figure 5:
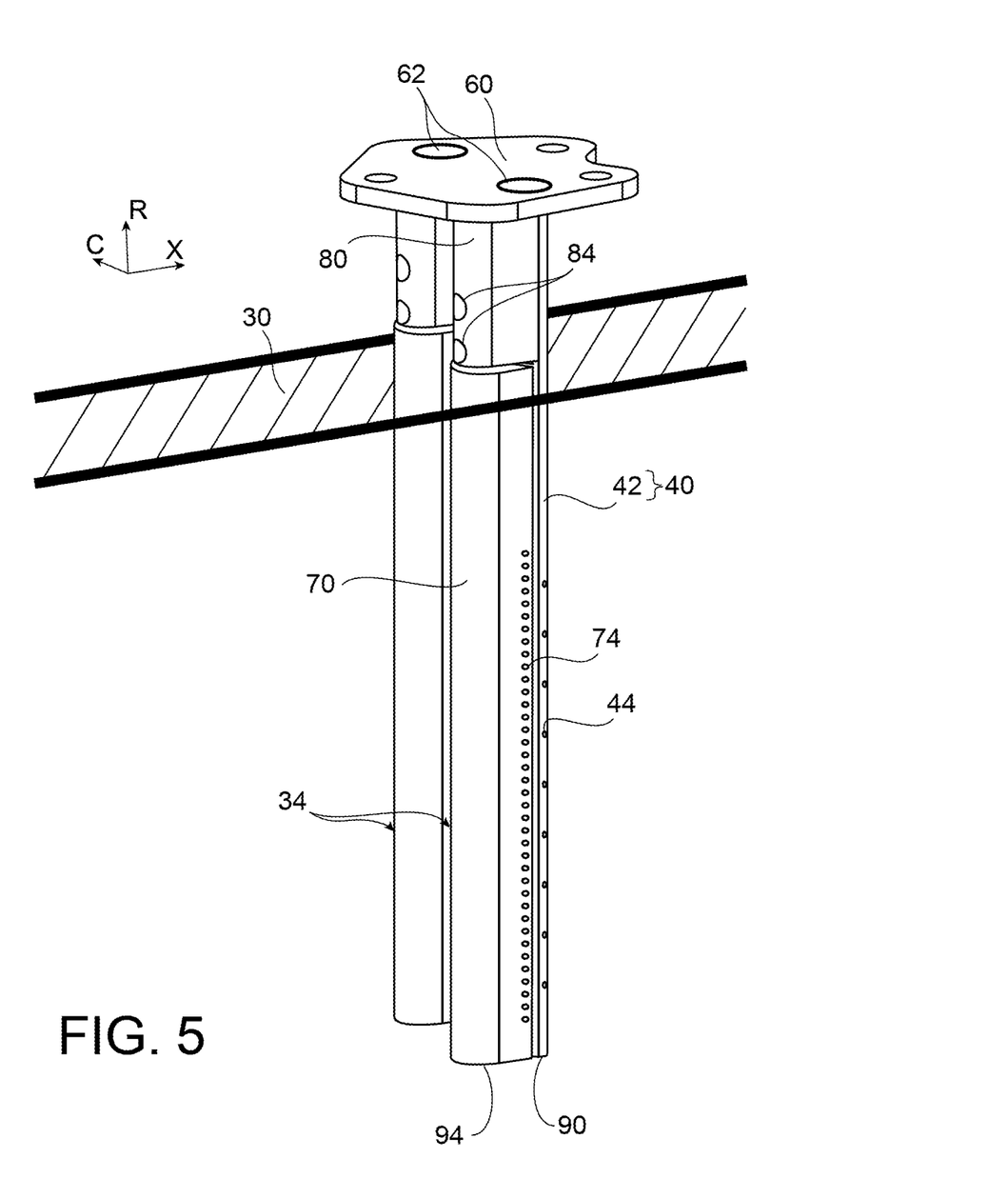
FIG. 5 is a schematic perspective view of an assembly comprising two fuel injection devices according to the preferred embodiment of the invention.
Figure 6:
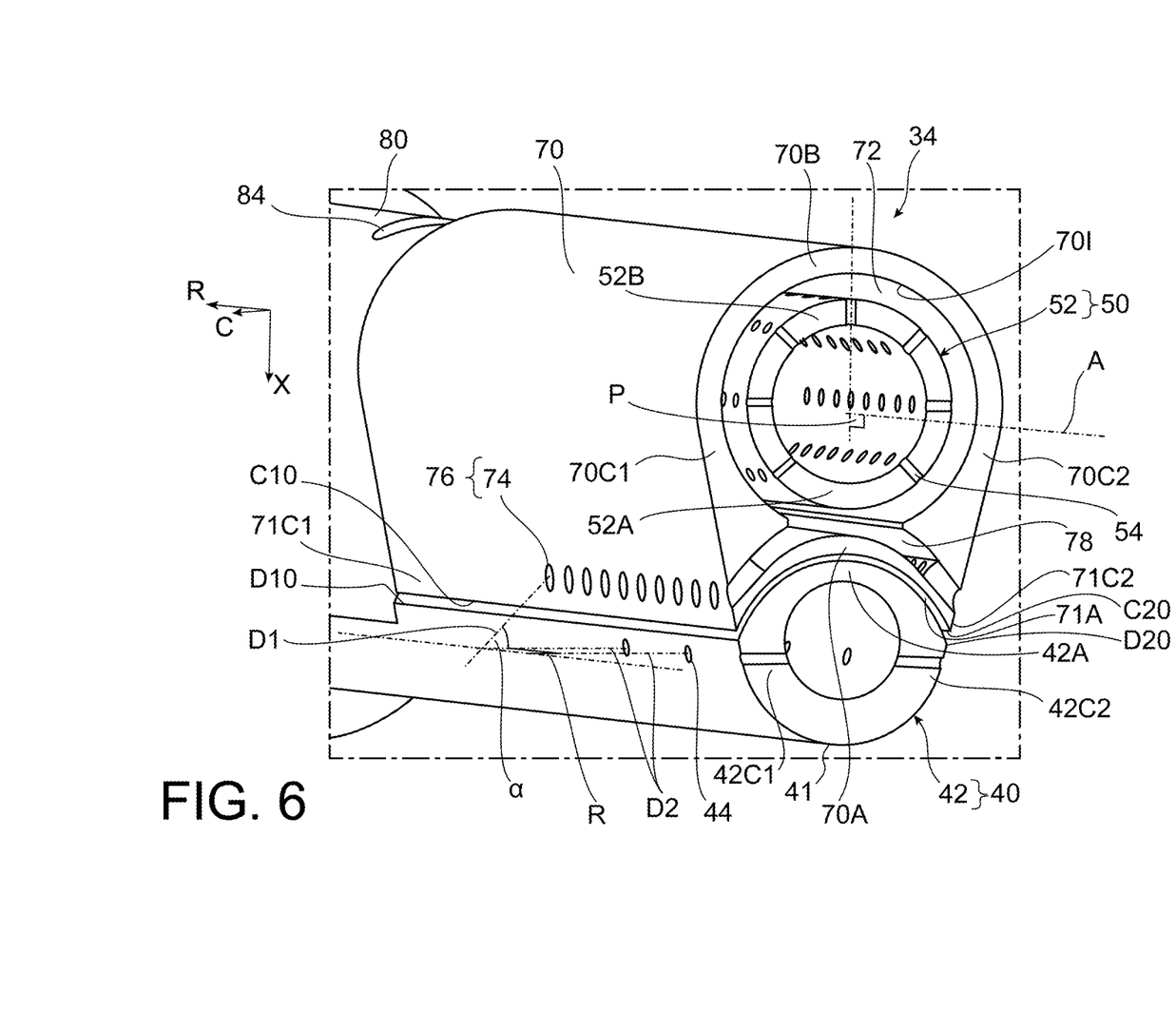
FIG. 6 is a schematic perspective view, and in cross-section, of a middle portion of one of the devices of FIG. 5.
Figure 7:
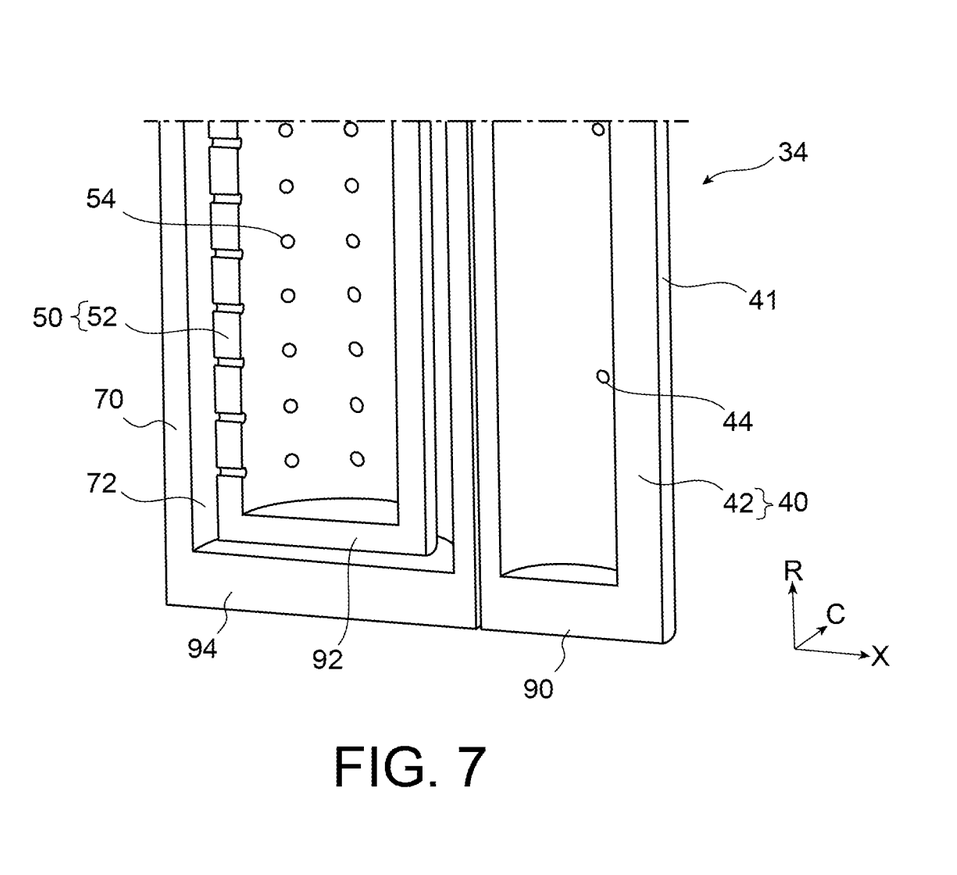
FIG. 7 is a schematic perspective view, and in longitudinal section, of a radially inner portion of one of the devices of FIG. 5.

FIGS. 5 to 7 illustrate a fuel injection device 34 according to a preferred embodiment of the invention, which allows overcoming at least part of the aforementioned drawbacks.

For example, this device 34 is herein again associated with another similar device via a common connection platform 60, within an assembly forming a double fuel injector arm. Hence, the following description is valid for each of the devices 34.

As will appear more clearly in FIGS. 6 and 7, the device 34 comprises a fuel tube 40 having a tubular wall 42 provided with fuel ejection ports 44, an air tube 50 having a tubular wall 52 provided with cooling air passage ports 54, and a casing 70 defining a volume 72 in which the air tube 50 extends with some clearance, i.e. at a distance from the casing 70. For example, the fuel tube 40 of each device 34 is supplied with fuel throughout a corresponding fuel inlet 62 provided in the connection platform 60.

The fuel tube 40 extends outside the volume 72, opposite and at a distance from a fuel tube side portion 70A of the casing 70, extending between the air tube 50 and the fuel tube 40.

The fuel tube side portion 70A of the casing 70 has a concave outer surface 71A opposite the fuel tube 40, so that the fuel tube side portion 70A of the casing 70 substantially matches with the shape of the fuel tube 40. The distance between the outer surface 71A and the fuel tube 40 is defined so as to be small but to avoid contact between the casing 70 and the fuel tube 40 in operation.

The casing 70 further includes an opposite side portion 70B having a convex outer surface, and two lateral portions 70C1, 70C2 each connecting the fuel tube side portion 70A to the opposite side portion 70B.

The opposite side portion 70B of the casing 70 is intended to face the gas flow in operation.

The lateral portions 70C1, 70C2 of the casing 70 have respective outer surfaces 71C1 and 71C2 in aerodynamic continuity with an outer surface 41 of the fuel tube 40.

A person skilled in the art will therefore understand that each of the respective outer surfaces 71C1 and 71C2 of the lateral portions 70C1, 70C2 of the casing has an edge C10, C20 respectively opposite a corresponding edge D10, D20 of the outer surface 41 of the fuel tube 40, and that at any point of each of the edges C10, C20, or at least at any point of a major portion of each of the edges C10, C20, a plane tangent to the considered outer surface 71C1 or 71C2 is also tangent to the outer surface 41 of the fuel tube 40.

The convex shape of the opposite side portion 70B and the aerodynamic continuity between the lateral portions 70C1, 70C2 and the fuel tube 40 allow reducing the aerodynamic pressure drop induced by the gas flow bypassing the device 34.

Furthermore, in the illustrated example, the lateral portions 70C1, 70C2 of the casing 70 converge towards each other in the direction of the fuel tube side portion 70A of the casing, and therefore in the direction of the fuel tube 40. This allows for a relatively large passage section within the air tube 50 without compromising the aerodynamics of the device.

In general, referring more particularly to FIG. 6, the casing 70 defines cooling air outlets 74 which connect the volume 72 defined by the casing to the outside of the device.

In the illustrated example, the cooling air outlets 74 are arranged on either side of a common midplane P of the fuel tube 40 and of the air tube 50.

In addition, each of the cooling air outlets 74 comprises, for example, a row of air ejection ports 76 opening throughout the outer surface of the casing, in this case throughout the outer surfaces 71C1 and 71C2 of the lateral portions 70C1, 70C2 of the casing.

In the illustrated embodiment, the air ejection ports 76 of each row open together into a corresponding continuous slot 78 formed throughout an inner surface 70I of the casing. Thus, each cooling air outlet 74 is formed by air ejection ports 76 on the exterior side and of a slot 78 on the interior side.

In general, each of the cooling air outlets 74 preferably has an air ejection direction D1 which intercepts, outside the device, a corresponding plane R defined by respective fuel ejection axes D2 of the corresponding fuel ejection ports 44 (those located on the same side as the considered cooling air outlet 74).

In the illustrated example, the air ejection direction D1 is the direction of air ejection axes respectively defined by the air ejection ports 76. In other embodiments, the ports 76 may be not parallel to each other, in which case each of these ports defines a respective air ejection direction D1. In other embodiments, each cooling air outlet 74 may have a longitudinally elongate shape, in which case the corresponding air ejection direction D1 is defined transversely to the midplane P. In all cases, the air ejection direction(s) D1 preferably intercept(s) the corresponding plane R.

In general, the casing 70 thus allows channeling cooling air derived from the ports 54 of the air tube 50 in the direction of the fuel jets derived from the ports 44 of the fuel tube 40, according to an incidence promoting atomization by shearing of the fuel jets, especially since the interception of the fuel jets thus takes place proximate to the ports 44 of the fuel tube. To this end, an angle α formed between each of the air ejection directions D1 and the plane R is preferably an acute angle, for example comprised between 30 degrees and 60 degrees.

In the illustrated embodiment, the cooling air outlets 74 are formed in the casing 70 itself, in this case in the lateral portions 70C1 and 70C2 of the casing. Alternatively, these air outlets may be defined between the casing 70 and the fuel tube 40.

In the illustrated embodiment, the tubular wall 52 of the air tube 50 includes a fuel tube side portion 52A which is free of cooling air passage ports and opposite which the cooling air outlets 74, in this case the slots 78, open into the volume 72 defined by the casing 70.

In addition, the cooling air passage ports 54 of the air tube 50 are arranged in several rows extending along a central axis A of the air tube. Said rows are evenly distributed around the central axis A within a portion 52B of the tubular wall 52 of the air tube complementary to said fuel tube side portion 52A.

Thus, the air derived from the cooling air passage ports 54 have to circulate in the volume 72 while bypassing the air tube 50 before reaching the cooling air outlets 74, which allows ensuring a homogeneous cooling of the casing 70 by air derived from the cooling air passage ports 54.

In addition, the multiplicity and distribution of the rows of cooling air passage ports 54 allow promoting cooling of the air tube 50 by thermal pumping and cooling of the casing 70 by air jet impact.

Moreover, the tubular wall 42 of the fuel tube 40 advantageously includes an air tube side portion 42A, as well as lateral portions 42C1, 42C2 extending from the air tube side portion 42A on two opposite sides of the air tube 42 respectively and in which the fuel ejection ports 44 are formed.

Advantageously, the lateral portions 42C1, 42C2 are thicker than the air tube side portion 42A. Thus, the risk of formation and propagation of thermal cracks at the ports 44 is limited as best as possible.

To this end, the tubular wall 42 has for example a circular inner section and an oblong outer section in a direction orthogonal to the common midplane P of the tubes.

In addition, the fuel ejection ports 44 preferably extend orthogonally to the common midplane P of the tubes. In this case, the plane R defined by the fuel ejection axes D2 is therefore orthogonal to the midplane P.

Moreover, referring to FIGS. 5 and 6, the device 34 includes a tubular-shaped base 80 intended to connect the device to the afterburner channel casing 28, for example via the connection platform 60.

The fuel tube 40, the air tube 50 and the casing 70 are rigidly connected to the base 80 independently of each other and extend freely relative to each other from the base 80. Thus, the invention enables a completely free differential expansion of each of these elements relative to the others. Thus, the wear problems encountered with devices of known types, due to differential expansions in operation, may be avoided.

To this end, the air tube 50 is for example tightly mounted in the base 80 or made in one-piece with the latter for example by casting or by laser fusion, whereas the fuel tube 40 and the casing 70 are for example fastened on the assembly thus formed.

For example, the base 80 includes at least one air intake port 84, in this case two such ports, intended to draw air from the secondary flow F3, and at least one inner passage (not visible in the figures) connecting each port 84 to the air tube 50 to supply the latter with cooling air.

Referring to FIG. 9, the tubes 40, 50 and the casing 70 comprise respective bottoms 90, 92, 94 at their free ends.

In particular, the bottom 92 of the air tube 50 extends at a distance from the bottom 94 of the casing 70 so that, even in operation, said bottoms 92 and 94 do not come into contact with each other despite the differential expansions that might affect the air tube 50 and the casing 70.

What is claimed is:

1. A fuel injection device for a turbojet engine afterburner, comprising:
   a base intended to connect the fuel injection device to an afterburner channel casing,
   a fuel tube having a tubular wall provided with fuel ejection ports and defining an outer surface of the fuel tube,
   an air tube having a tubular wall provided with cooling air passage ports, and
   a casing defining a volume in which the air tube extends with some clearance and outside of which the fuel tube extends,
   wherein the casing includes a casing fuel tube side portion extending between the air tube and the fuel tube and having a concave outer surface opposite the fuel tube, an opposite side portion having a convex outer surface, and two lateral portions each connecting the casing fuel tube side portion to the opposite side portion and having respective outer surfaces in aerodynamic continuity with the outer surface of the fuel tube;
   wherein the fuel tube extends opposite and at a distance from the casing fuel tube side portion of the casing,
   wherein the casing defines cooling air outlets formed in the lateral portions of the casing and which connect the volume defined by the casing to the outside of the device,
   and wherein the fuel tube, the air tube and the casing are rigidly connected to the base independently of each other and extend freely relative to each other from the base.

2. The device according to claim 1, wherein each of the cooling air outlets comprises at least one row of air ejection ports opening throughout an outer surface of the casing.

3. The device according to claim 1, wherein the lateral portions of the casing converge towards each other in the direction of the casing fuel tube side portion.

4. The device according to claim 1, wherein the tubular wall of the air tube includes a tubular wall fuel tube side portion which is free of cooling air passage ports and opposite which the cooling air outlets open into the volume defined by the casing.

5. The device according to claim 4, wherein the cooling air passage ports are arranged in several rows extending along a central axis of the air tube, said rows being evenly distributed around said central axis within a portion of the tubular wall of the air tube complementary to said tubular wall fuel tube side portion of the tubular wall of the air tube.

6. The device according to claim 1, wherein the tubular wall of the fuel tube includes an air tube side portion, as well as lateral portions in which the fuel ejection ports are formed and which are thicker than the air tube side portion.

7. The device according to claim 1, wherein the cooling air outlets are arranged on either side of a common midplane (P) of the fuel tube and of the air tube.

8. The device according to claim 7, wherein each of the cooling air outlets has an air ejection direction which intercepts, outside the device, a plane (R) defined by respective fuel ejection axes of the corresponding fuel ejection ports.

9. The device according to claim 7, wherein the fuel ejection ports extend orthogonally to the common midplane (P) of the fuel tube and of the air tube.

10. A turbojet engine rear portion, comprising an afterburner channel, an afterburner channel casing surrounding said channel, and at least one fuel injection device according to claim 1 connected to the afterburner channel casing, so that the air tube is located upstream of the fuel tube.

11. The turbojet engine rear portion according to claim 10, wherein the base of each fuel injection device includes at least one air intake port arranged to supply the air tube with air derived from a turbojet engine secondary flow.

12. An aircraft turbojet engine, comprising a rear portion according to claim 10.

* * * * *